United States Patent Office 3,055,897
Patented Sept. 25, 1962

3,055,897
PROCESS FOR THE PRODUCTION OF TRIAZINE-PERHYDRATE COMPOUNDS
Otto Schwartz, Dusseldorf-Benrath, and Roland Schnürch, Dusseldorf, Germany, assignors to Therachemie Chemisch Therapeutische Gesellschaft m.b.H., Dusseldorf, Germany, a corporation of Germany
No Drawing. Filed July 20, 1960, Ser. No. 43,984
Claims priority, application Germany Aug. 8, 1959
4 Claims. (Cl. 260—249.6)

The invention relates to a process of manufacturing novel organic perhydrate compounds, and, more particularly, to the manufacture of such compounds by the reaction of triazines with hydrogen peroxide.

Hydrogen peroxide forms addition products with a number of organic compounds, yielding solid materials. Such solid organic perhydrates generally are obtained from the solutions of the organic compounds and hydrogen peroxide by evaporation or by intensive cooling. These processes are, in part, very involved and frequently require special equipment in order to facilitate economical processes. To date, organic compounds to be used for the reaction have been urethanes, acetamide, aminoacetic acid and urea, to name but a few. In practice, solely the urea addition products have attained significance as solid organic perhydrates. The solutions which can be prepared therefrom, however, suffer from the disadvantage that the organic component predominates therein, a fact which frequently is undesirable.

It now has been found that solid organic perhydrates can be prepared in a simple manner with very high yields. These compounds, moreover, not only have good stability but especially have the advantage that, by suitable methods, solutions can be prepared which, in spite of the presence of organic component, contain the latter merely to a slight extent. These novel organic perhydrate compounds are obtained by reacting, according to the invention, amino-1.3.5-triazine with hydrogen peroxide solutions. Particularly useful as the triazine component are such compounds which contain at least two amino groups, such as 2.4-diamino-6-aryl-1.3.5-triazine, and especially melamine.

The reaction can be accomplished in such a manner that to a hydrogen peroxide solution the triazine is added in finely divided state. On account of the generally low solubility of the triazines or of melamine, respectively, in water, it is opportune to provide for good mixing of the components. The reaction can be carried out without supply of external heat, especially since a certain amount of warming occurs during the reaction. However, in order to avoid decomposition of the hydrogen peroxide, it is of distinct advantage to keep the temperature in the reaction mixture below 40° C., and preferably not to allow it to exceed 25° C. Hence, the addition can also be carried out under cooling, especially when highly concentrated hydrogen peroxide-containing solutions are employed. After a short time, amino-1.3.5-triazine perhydrate begins to separate whose $H_2O_2$ content, e.g., in the case of melamine, has a maximum of approximately 21 percent by weight, corresponding to a composition of 1 mol triazine to 1 mol $H_2O_2$. It further has been found that the $H_2O_2$ content of triazine perhydrate formed depends upon the proportions of triazine to $H_2O_2$ applied and especially upon the concentration of the hydrogen peroxide solution. It is indicated to react per mol amino-1.3.5-triazine with at least one mol $H_2O_2$ in form of an at least 5 percent (by weight) hydrogen peroxide solution, and preferably with a solution containing 30–40 percent by weight.

After filtration of the triazine perhydrate, the concentration of $H_2O_2$ in the filtrate is adjusted to the original concentration by addition of highly concentrated hydrogen peroxide solutions. Thereby it has frequently been found opportune to start, using the above-described method, with a certain excess $H_2O_2$, this excess being approximately 2–6, and preferably 2–3, mols, per mol triazine. Under certain conditions, the filtrates can directly be re-used for the production of triazine perhydrates which have a somewhat lower $H_2O_2$ content. It goes without saying that it also is feasible to obtain the desired concentration of the $H_2O_2$ by evaporation of the filtrate in vacuo.

The triazine perhydrate obtained, after separation, is dried and comminuted. The perhydrate exhibits excellent stability even without addition of a stabilizer. Should particularly unfavorable conditions prevail during storage or use of the perhydrate, the stability can be increased by the addition of the commonly used perhydrate stabilizers. This addition of stabilizers can be carried out before or during the reaction, but, if desired, they also may be added to the finished product. Suitable stabilizers, as known for these purposes, are, e.g., monosodium phosphate, di- or tetrasodium pyrophosphate, magnesium silicate, 8-oxyquinoline, the disodium salt of ethylene diamine tetraacetic acid and, particularly, citric acid.

The triazine perhydrates also can be produced in the reverse order of that described above, i.e., by adding to the solid component the hydrogen peroxide solution. This can be accomplished continuously or in portions. Such a reaction can be carried out particularly well in large-scale production in a heavy-duty mixer, a kneader, or in equivalent devices, such as corresponding agitators. When desired, it also is feasible to start with both components, i.e., to add both continuously. It is of advantage to use in this continuous process $H_2O_2$ solutions having a minimum concentration of approximately 30 percent $H_2O_2$ by weight. The reaction product is removed from the kneader while still moist and is conducted through a drier. In order to avoid $H_2O_2$ losses, it is opportune not to heat the finished product above 50° C. in this drying process. This method is particularly suited for a continuous process. The novel organic perhydrates thus obtained are free-flowing powders which do not agglomerate during storage after drying and which are not hygroscopic. These perhydrates have the advantages of being simple to manufacture, having a high yield and good stability and of permitting the preparation of solutions which, in spite the presence of an organic component, contain the latter only to a slight extent. This is the case because it has been found that with water or also with certain organic solvents, the hydrogen peroxide can be dissolved out, provided that the solvent is used at a sufficient excess.

For the preparation of a hydrogen peroxide-containing solution poor on organic substances, a column is filled with, e.g., finely ground melamine perhydrate, and a corresponding quantity of water is allowed to flow therethrough. Thereby, a filtrate is obtained whose $H_2O_2$ content is considerably higher than corresponds to the equivalent amount of melamine dissolved in the filtrate. However, it also is feasible to add to the amino-1.3.5-triazine perhydrate a larger quantity of water and subsequently to separate the undissolved amino-1.3.5-triazine by decantation or filtration. The melamine content in solutions prepared in this manner is at a maximum of 0.3 percent at 20° C.

If desired, organic solvents can be employed, as stated above, whereby diethyl ether, acetic ethyl ether, isobutanol, and others can be used. In these instances, a solution of hydrogen peroxide in these solvents is obtained.

Aside from the utilization of the novel amino triazine perhydrates for the production of hydrogen peroxide solutions, they also can be used, together with other organic and inorganic components, known per se, especially for cleaning and disinfecting processes.

The invention now will be further illustrated by a number of examples. However, it should be understood that these are given merely by way of explanation, not of limitation, and that numerous changes may be made in the details without departing from the spirit and the scope of the invention as hereinafter claimed.

Example 1

126 g. finely powdered pure melamine are suspended with agitation for approximately 20 minutes in 0.185 liter 35.6 percent by weight hydrogen peroxide solution, stabilized with approximately 0.06 g. $Na_4P_2O_7$, at room temperature. The molar proportions melamine to $H_2O_2$, hence, is 1:2.2.

After that, the melamine perhydrate formed is filtered, washed with a small amount of water and dried at 45° C. The yield, calculated on the melamine charged, is over 99 percent. The $H_2O_2$ content of the melamine perhydrate obtained is 20.4 percent by weight. When the amount of hydrogen peroxide present in the filtrate is added to the hydrogen peroxide bound to the melamine, the loss on $H_2O_2$ is approximately 3 percent, i.e., very slight.

Example 2

928 g. melamine are suspended in 1.67 liter 25.5 percent by weight hydrogen peroxide solution, to which for stabilization had been added 0.5 g. $Na_4P_2O_7$. The molar proportion of melamine to $H_2O_2$ equals 1:1.9. After continuing as described in Example 1, 1140 g. melamine perhydrate are obtained having a $H_2O_2$ content of 20 percent by weight.

Example 3

378 g. melamine are suspended in molar proportions of 1:3 in 0.79 liter hydrogen peroxide solution whose concentration is 34.6 percent by weight. Agitation is continued for a while after addition has been completed. After filtration and drying, 472 g. melamine perhydrate are obtained having a $H_2O_2$ content of 20.3 percent. The filtrate of the $H_2O_2$ solution, whose concentration, after the reaction and because of the added wash water, is approximately 24 percent by weight, is mixed with 50 percent by weight $H_2O_2$ solution until a concentration of 384 g. $H_2O_2$ per liter has been attained. This solution again is reacted with melamine in the molar proportion of 1:3. The melamine perhydrate obtained, after treatment as described in Example 1, has a content of $H_2O_2$ of 19.9 percent by weight.

Example 4

Melamine is suspended in a 49.9 percent (by weight) hydrogen peroxide solution in molar proportions of 1:3.5. After proceeding as described in Example 1, a melamine perhydrate having a 20.5 percent by weight $H_2O_2$ content is obtained.

Example 5

With the method as described in Example 1, 5 percent by weight hydrogen peroxide solution are reacted with melamine in equimolar proportions. The perhydrate thus obtained has a $H_2O_2$ content of 12.2 percent by weight.

Example 6

126 g. melamine are treated with 0.35 liter 10 percent (by weight) $H_2O_2$ solution for approximately 30 minutes. The molar proportions of melamine to $H_2O_2$ are 1:1.1. After filtration and washing with 0.15 liter water, 145 g. perhydrate are obtained having a $H_2O_2$ content of 13.1 percent by weight.

When, however, these starting products are reacted in molar proportions of 1:3.2, 149 g. perhydrate, having a 15.6 percent by weight $H_2O_2$ content, are obtained while otherwise working in exactly the same manner.

Example 7

126 g. melamine are reacted in 0.27 liter hydrogen peroxide solution of 35.6 percent by weight (molar proportions melamine to $H_2O_2$=1:3.2). 3 g. magnesium silicate had been added to the solution as stabilizer. After filtration and drying, a melamine perhydrate was obtained having a $H_2O_2$ content of 20.9 percent.

When 100 g. finely ground melamine perhydrate, as prepared in this example, are suspended with agitation in 1 liter water at 20° C., a solution is obtained after filtration containing 20.9 g. $H_2O_2$ per liter. The melamine content of this solution is only 0.3 percent.

When, in lieu of melamine perhydrate, the commercially available carbamide perhydrate is used for the production of such a $H_2O_2$ solution, approximately 12 times as much organic substance is contained in the solution.

Example 8

2.4-diamino-6-phenyl-1.3.5-triazine are suspended in hydrogen peroxide solution in molar proportions of 1:5.8. The concentration of the hydrogen peroxide solution used and stabilized with a small amount of sodium pyrophosphate, is 35.6 percent by weight. After addition is completed, agitation is continued for a while. The 2.4-diamino-6-phenyl-1.3.5-triazine perhydrate thus formed is filtered, washed and dried. The $H_2O_2$ content of this product is approximately 11 percent. The $H_2O_2$ solution obtained as the filtrate is re-used for a new charge.

Example 9

To 2 liter 33.5 percent (by weight) hydrogen peroxide solution, 0.6 g. $Na_4P_2O_7$ and 3 kg. melamine are added (molar proportion melamine to $H_2O_2$ equals 1:1). The reaction mixture is mixed for 15 minutes in a planetary stirrer. Thereby, the temperature rises to 45° C. The melamine perhydrate thus obtained is dried at 45° C. and has $H_2O_2$ content of 20.4 percent. The yield is 3.77 kg., or practically 100 percent, calculated on melamine. Of the hydrogen peroxide used, 96 percent are present in the end product.

Example 10

Melamine and $H_2O_2$ solution (35.3 percent by weight) in equimolar proportions are kneaded in a kneading machine for 20 minutes, and then dried at 45° C. A melamine perhydrate containing 20.9 percent $H_2O_2$ are obtained, i.e., in practically 100 percent yield, calculated on the melamine.

We claim as our invention:

1. A process for the production of organic perhydrates, which consists of reacting a compound, selected from the group consisting of melamine and 2.4-diamino-6-phenyl-1.3.5-triazine, with hydrogen peroxide in aqueous solution of at least 5 percent concentration by weight in at least equimolar proportions at temperatures of no more than 40° C., filtering the perhydrate thus obtained, and drying the same at a temperature not exceeding 50° C.

2. The process as claimed in claim 1, wherein the peroxide solution used in the reaction has a concentration of at least 30 and up to 40 percent.

3. Melamine perhydrate having a hydrogen peroxide content of substantially 21 percent by weight and the formula:

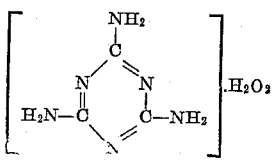

4. 2.4-diamino-6-phenyl-1.3.5-triazine perhydrate having a peroxide content of substantially 11 percent by weight.

References Cited in the file of this patent

Chemical Abstracts, vol. 38, col. 5366 (1944).
Chemical Abstracts, vol. 44 col. 8063 (1950).
Smolin et al.: "S-Triazines and Derivatives," pp. 545 and 553–4, Interscience Publishers Inc., N.Y. (February 1959.)